United States Patent Office 3,362,235
Patented Jan. 9, 1968

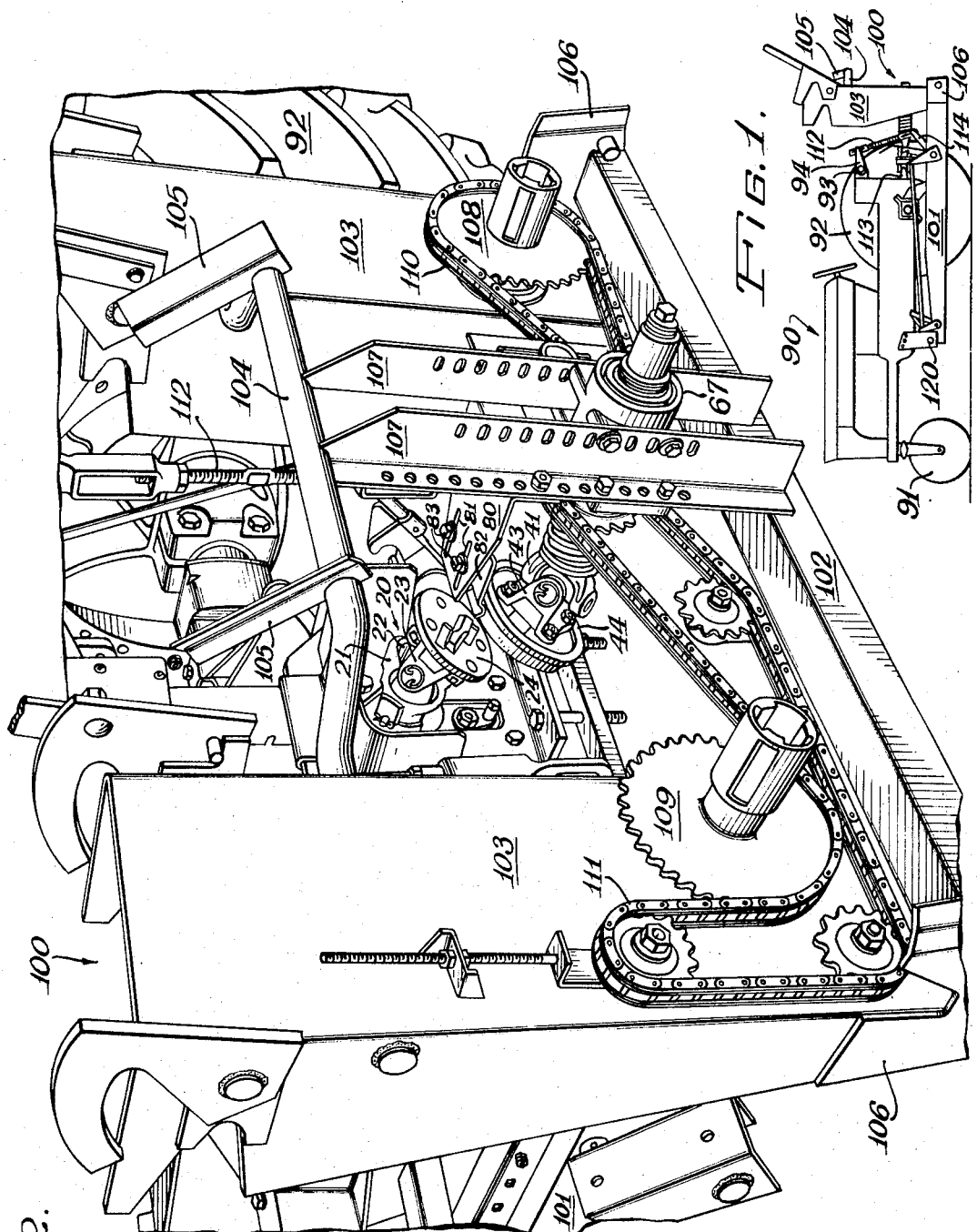

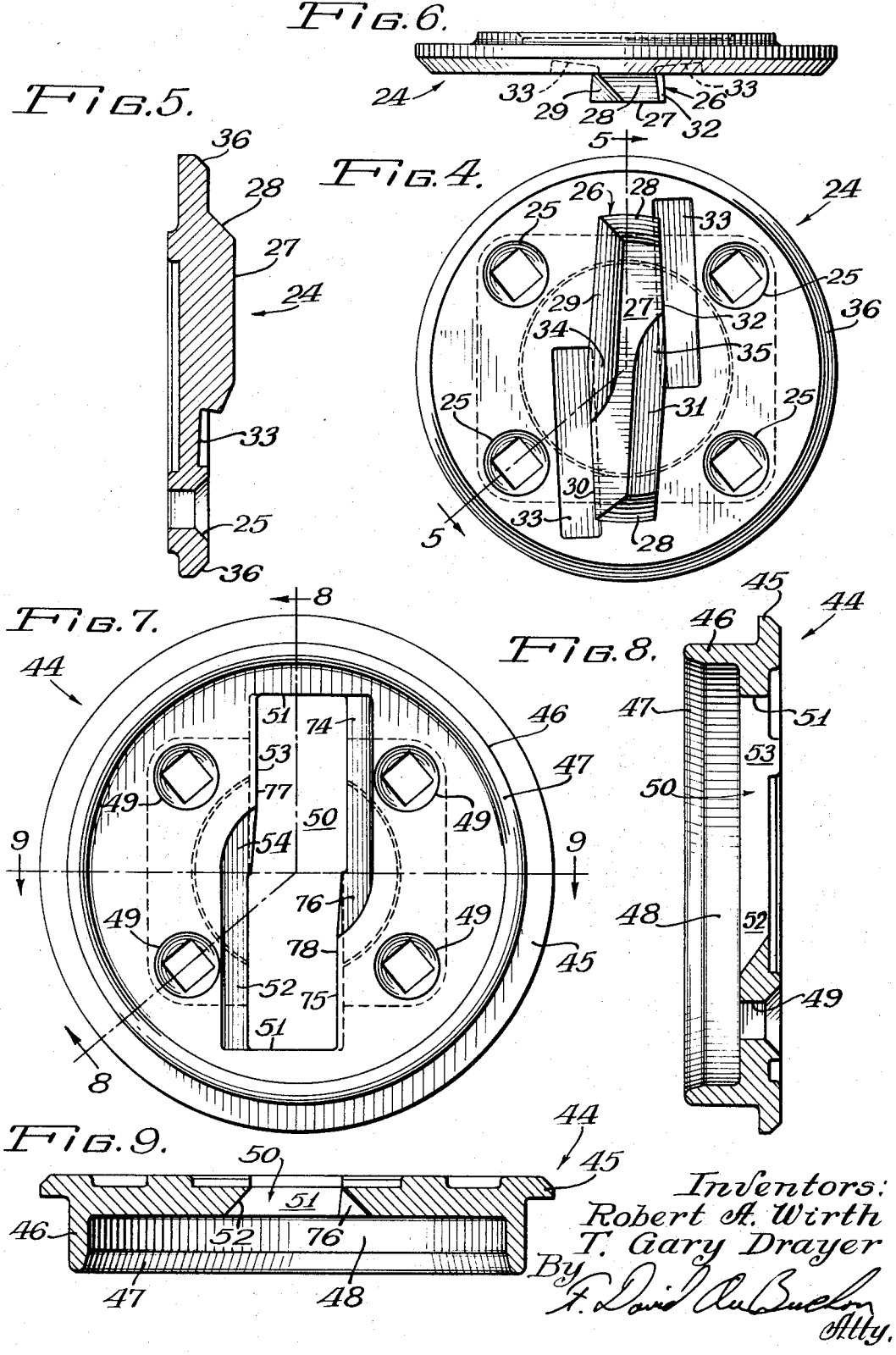

3,362,235
AUTOMATIC COUPLING UNIVERSAL DRIVE
Robert A. Wirth, Maquoketa, Iowa, and T. Gary Drayer, East Moline, Ill., assignors to International Harvester Company, a corporation of Delaware
Filed Feb. 10, 1966, Ser. No. 526,550
14 Claims. (Cl. 74—11)

The present invention relates to a device for automatically coupling an implement or implement frame to a power source such as a tractor, and more particularly to an implement frame that is automatically coupled to the power takeoff shaft of a tractor upon elevating the frame into position relative to the tractor.

In mounting driven implements on tractors, it has been the common practice to first connect the implement or the implement frame to the tractor and then manually connect the power takeoff shaft of the tractor to the input drive shaft of the implement. This of course is time consuming and necessitates the driver dismounting from the tractor to perform the manual coupling operation. There have been some devices developed where an implement can be simultaneously hitched and coupled to the tractor. However, these devices require precision alignment between the tractor and implement in order to accomplish the connection. During operation on rough terrain, poor visibility or during adverse weather conditions, these devices are not completely acceptable.

The general purpose of this invention is to provide a device that automatically couples the input drive shaft of the implement to the power takeoff shaft of a power source such as a tractor while hitching the implement to the power source. This coupling is accomplished without a precision alignment between the implement and the tractor and it is not necessary for the operator to back the tractor into the proper relative position with respect to the implement.

An object of the present invention is the provision of a device for automatically coupling the power takeoff shaft of a power source to the input drive shaft of an implement while hitching the implement to the power source.

Another object is to provide a device for automatically coupling the power takeoff shaft of a tractor to the input drive shaft of an implement while pivotally elevating the implement relative to the tractor.

A further object of the invention is the provision of a device for automatically coupling the power takeoff shaft of a power source to the input drive shaft of an implement including means for releasably holding the implement coupling in position to receive the power source drive coupling upon elevation of the implement relative to the power source.

These and other objects of the invention will become more apparent from the specification and drawings wherein:

FIGURE 1 is a schematic view of a tractor having an implement frame mounted thereon.

FIGURE 2 is a perspective view from the left rear of the tractor showing the implement frame in the lowered position.

FIGURE 4 is a side view of the tractor coupling plate.

FIGURE 5 is a cross-sectional view of the tractor coupling plate taken along lines 5—5 of FIGURE 4.

FIGURE 6 is a plan view of FIGURE 4.

FIGURE 7 is a side view of the implement coupling plate.

FIGURE 8 is a cross-sectional view of the implement coupling plate taken along lines 8—8 of FIGURE 7.

FIGURE 9 is a cross-sectional view of the implement coupling plate taken along lines 9—9 of FIGURE 7.

Figure 3:
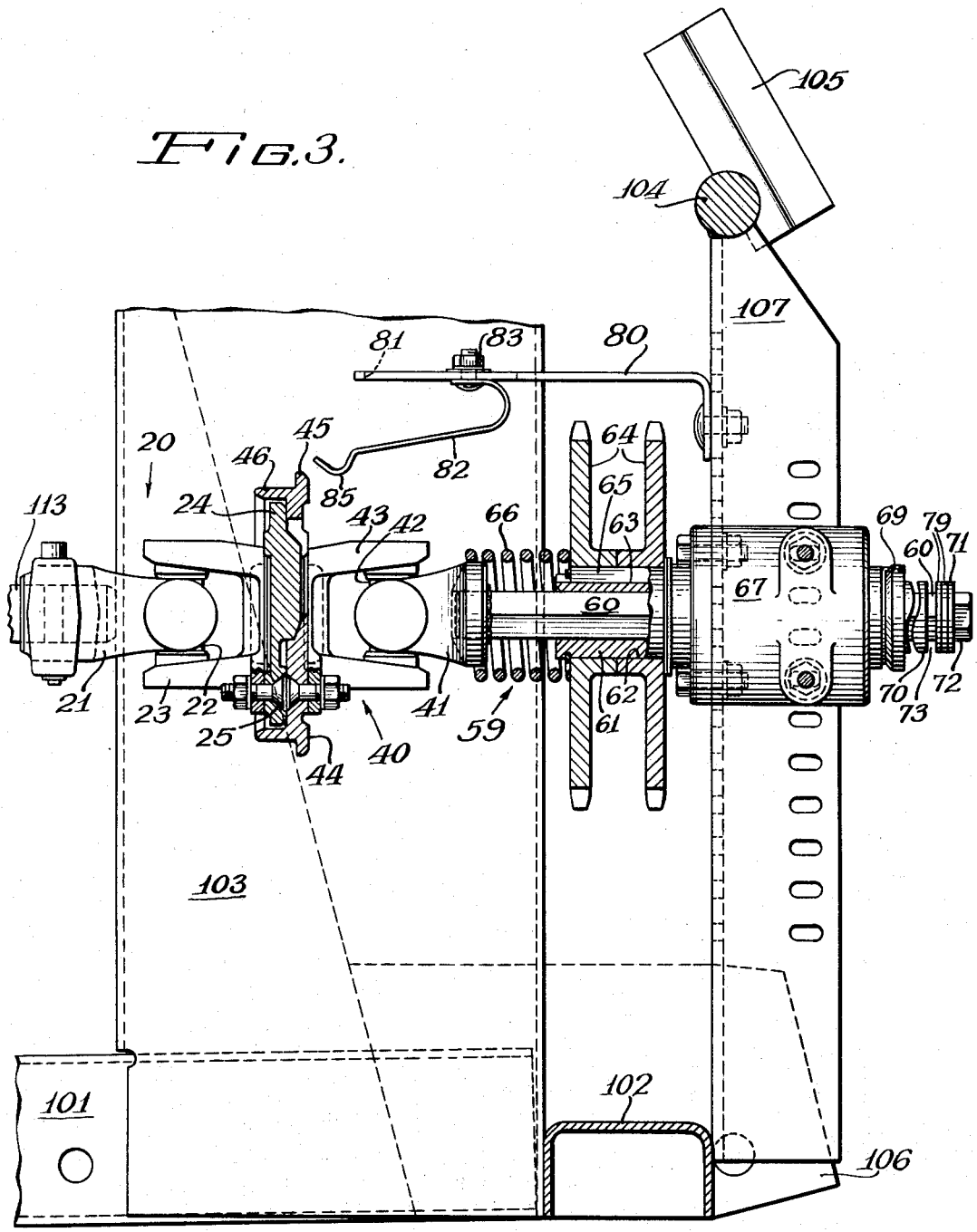
FIGURE 3 is a side view of the implement and tractor couplings shown partially in cross-section for the purpose of clarity.

Referring now to the drawings wherein like reference characters designate like or corresponding parts throughout the several views, there is shown in FIGURE 1 a conventional farm tractor designated 90 having front dirigible wheels 91 and rear drive wheels 92. The tractor 90 is provided with a rock shaft 93 having rock shaft arms 94 secured thereto, and a power takeoff shaft designated 113. In FIGURE 1 there is shown an implement frame assembly 100 mounted on said tractor 90. The frame assembly includes longitudinal extending beams 101 connected at their rear by a transverse beam 102 and having vertical posts 103 extending upwardly from each of the rear corners. A horizontal pipe 104 connects the posts 103 at their upper ends. The horizontal pipe 104 carries guide plates 105 and the base of the post 103 carries rearwardly extending plates 106. The purpose of these plates is to facilitate mounting implements on the implement frame assembly 100 and thus are not important to the understanding of the subject invention. A pair of vertical channels 107 extend upwardly from the transverse beam 102 and are connected to the horizontal pipe 104. The channels 107 are provided with a plurality of apertures for mounting the bearing housing 67 and the support guide bracket 80. The posts 103 support sprockets 108 and 109 that are driven respectively by chains 110 and 111.

The implement frame assembly 100 is pivotally connected to the tractor 90 at a point 120 midway between the front wheels 91 and the rear wheels 92. Thus the rear end of the implement frame assembly 100 can be raised and lowered vertically. The implement frame assembly 100 is connected to the tractor rock shaft 93 through lifting links 112 that are connected at one end to the rock shaft arms 94 and at the other end to a lifting arm carried by the implement frame assembly. The construction of the implement frame assembly 100 is not a part of the subject invention and thus the above description is considered adequate for an understanding of this invention. For a more detailed disclosure of the construction of the implement frame assembly, reference may be had to application Ser. No. 434,972 to Reynold Barkstrom et al., filed on Feb. 24, 1965, now Patent No. 3,320,730, and to application 490,441 to T. Gary Drayer et al., filed on Sept. 27, 1965.

As can be best seen in FIGURES 2 and 3, the power takeoff shaft 113 of the tractor 90 is provided with a drive coupling 20. The drive coupling 20 includes a first U-member 21 connected by a spider 22 to a second U-member 23. A drive coupling plate 24 is secured to the bight portion of the second U-member 23 by bolts or the like. The bolts extend through countersunk apertures 25 in the drive coupling plate and thus the bolts do not produce protrusions on the planar face of the drive coupling plate. As is indicated in FIGURE 2, the pivotable movement between the first U-member 21 and the second U-member 23 is restricted to an arc of approximately 90°. Thus as the drive coupling 20 is uncoupled, the drive coupling plate assumes an angle of 45° or less to the vertical.

Referring now to FIGURES 4 through 6 inclusive, the shape of the drive coupling plate will be described. As is best seen in FIGURE 4, the drive coupling plate 24 is round and has a beveled edge 36. The planar face of the drive coupling plate is interrupted by a lug 26 and a pair of surface depressions 33. As previously stated, a plurality of countersunk apertures 25 are formed in the planar face of the drive coupling plate. The lug 26 extends diametrically of the drive coupling plate and has a flat upper surface 27. The end surfaces 28 of the lug 26 are conical and thus upon rotation of the drive coupling plate, generate a smooth surface. The lug 26 is wider at its center than at its ends and thus has four side surfaces designated 29, 30, 31 and 32.

Surfaces 29 and 31 converge towards each other in a direction away from the planar face of the drive coupling plate. Surfaces 30 and 32 diverge from each other in a direction away from the planar face of the drive coupling plate and thus the lug 26 has undercuts as seen in FIGURE 4. Since surfaces 29 and 30 lean in opposite directions, a curved extension 34 of surface 29 is required to merge the two surfaces. Likewise a curved extension 35 of side surface 31 is required to merge with side surface 32. Surface depressions 33 are formed in the drive coupling plate adjacent the intersection of side surfaces 30 and 32 with the planar face of the drive coupling plate. The purpose for these surface depressions will be clarified after the construction of the implement coupling has been described.

The implement frame assembly 100 carries a bearing housing 67 that journals an input drive shaft 61. As can be best seen in FIGURES 2 and 3 the left-hand free end of the input drive shaft 61 is provided with an implement coupling 40 that is adapted to be coupled to the drive coupling 20. The implement coupling 40 includes a universal joint comprising a first U-member 41 connected by a spider 42 to a second U-member 43. An implement coupling plate 44 is secured by bolts or the like to the bight portion of the second U-member 43.

Referring now to FIGURES 7 through 9 inclusive, the structure of the implement coupling plate will be described. The implement coupling plate 44 is circular in shape and has a substantially flat planar face. An annular ridge 46 having a beveled edge 47 protrudes up from the planar face of the implement coupling plate. The annular ridge 46 forms a rim 45 and a well 48. The well 48 formed by the annular ridge 46 is dimensioned to loosely receive the tractor coupling plate 24. A plurality of countersunk apertures 49 are formed in the planar face of the implement coupling plate 44 for the purpose of connecting the implement coupling plate to the second U-member 43. A diametrically arranged slot 50 is formed in the implement coupling plate 44. The slot 50 is adapted to receive the lug 26 formed on the tractor coupling plate 24. The end walls 51 of the slot 50 are normal to the planar face of the implement coupling plate and are adapted to cooperate with the conical end surfaces 28 of lug 26 to guide the tractor and implement coupling plates into proper alignment. The left-hand side wall of slot 50 as seen in FIGURE 7 is formed by three surfaces designated 52, 53 and 54. The right-hand side wall of slot 50 is also formed of three corresponding surfaces designated 74, 75 and 76. Surfaces 52 and 74 are diagonally arranged with respect to each other and converge towards each other in a direction into the planar face of implement coupling plate 44. Surfaces 53 and 75 are diagonally located with respect to each other and diverge away from each other in a direction away from the planar face of implement coupling plate 44. Because of the opposite slant of surfaces 52 and 53, a curved surface 54 is required to join these surfaces. Likewise a curved surface 76 is required to join surface 74 to surface 75.

As the implement coupling plate 44 approaches the drive coupling plate 24, surfaces 52 and 74 engage surfaces 29 and 31 causing a relative rotation between the drive and implement coupling plates. This relative rotation permits the undercut surfaces 53 and 75 to contact surfaces 30 and 32 thus locking the implement and drive coupling plates in driving engagement. Upon energizing the power takeoff shaft 113, the interaction between surfaces 30 and 32 with surfaces 53 and 75 will tend to draw the implement coupling plate towards the drive coupling plate. Upon engagement of the planar faces of the two coupling plates, this axial movement will cease. This axial movement would have a tendency to cause edges 77 and 78 of the implement coupling plate to cut into the planar face of the drive coupling plate. The purpose of the surface depressions 33 formed in the drive coupling plate is to prevent this cutting or digging in.

As previously stated a bearing housing 67 is carried by the channel 107 of the implement frame assembly. The bearing housing 67 journals the input drive shaft 61. The implement coupling 40 is secured to one end of the input drive shaft 61 by connecting means 59. The connecting means 59 permits the implement coupling 40 to move axially of the input drive shaft 61, within the limits, but prevents relative rotation therebetween. A rod 60 is rigidly secured to the bight portion of the first U-member 41. The rod 60 has an irregular or unsymmetrical cross-section and as illustrated is shown as hexagonally shaped. A tubular opening 62 is formed in the input drive shaft 61 and corresponds in cross-sectional shape to rod 60. Thus the rod 60 can be slidably inserted into opening 62, but because of the irregular cross-sectional shape, relative rotation between the rod and the input drive shaft is not permitted. A keyway 63 is formed in the outer peripheral surface of the input drive shaft 61 that is adapted to receive key 65 for locking a pair of sprockets 64 to the input drive shaft. A compression spring 66 surrounds the rod 60 and as illustrated has one end bearing against the bight portion of the first U-member 41 and the other end bearing against sprocket 64. Since the sprockets 64 are spaced from the bearing housing 67 by washer 68 and the bearing housing 67 is secured to the implement frame assembly, it can be stated that the right-hand end of spring 66 as seen in FIGURE 3 bears against the implement frame assembly 100. A bearing lock nut 69 is provided on the right-hand side of bearing housing 67 as seen in FIGURE 2 to prevent axial movement of the input drive shaft. The rod 60 has a free end portion that extends out through the bearing housing 67 and is tapped to receive a bolt 72 by which a washer 71 is secured to the end of rod 60 thus forming a shoulder. Additional washers 79 having apertures adapted to slide over rod 60 and a spacer designated 70 are carried by the rod 60 between the bearing lock nut 69 and the shoulder-forming washer 71. As seen in FIGURE 3, the washers 79 in the spacer 70, do not occupy the entire space between the bearing lock nuts 69 and the shoulder washer 71, and thus leave a gap designated 73. By using more or less washers 79, the size of this gap can be adjusted. When the implement coupling plate is not in engagement with the drive coupling plate, spring 66 will cause the implement coupling to be displaced axially until the space between the bearing lock nut 69 and the shoulder-forming washer 71 is completely occupied by the washers 79 and the spacer 70. Thus the amount of axial shift permissible in the implement coupling can be adjusted by adding or subtracting washers 79.

As can be best seen in FIGURES 2 and 3, a support guide bracket 80 is mounted on channels 107 and extends such that it overlies the implement coupling 40. A spring guide or clip 82 is secured to the guide bracket by nuts and bolts 83 that extend through slots 81 formed in the guide bracket 80. By adjusting the position of the nuts and bolts 83 along slots 81, the relative position of the spring clip 82 can be varied with respect to the guide bracket 80. The free end of the spring clip 82 is shaped to form a ridge 85. As can be best seen in FIGURE 2, the ridge 85 is adapted to grasp the implement coupling plate 44 between the rim 45 and its annular ridge 46 to thus hold the implement coupling plate 44 in an upwardly facing position.

Operation

In hitching and coupling the implement frame assembly 100 to the tractor 90, the tractor is backed into position over the implement frame assembly 100. The upper ends of the lifting link 112 are fastened to the free ends of the rock shaft arms 94. Upon rotation of the rock shaft 93 the front end of the implement frame assembly 100 is raised and automatically pivotally connected to the tractor at a point 120 midway between the front wheels 91 and the rear wheels 92. This operation is more fully described in the above referred to application to Reynold Barkstrom et al. In FIGURE 2, the relative positions of the implement and drive couplings are shown when the front end of the implement frame assembly 100 has been pivotally connected to the tractor and prior to elevating the rear end of the implement frame assembly. As best seen in FIGURE 2 with the implement frame assembly in this position, the drive coupling plate 24 is facing downwardly at an acute angle to the vertical. The implement coupling plate 44 is facing upwardly at an acute angle to the vertical by virtue of it being held by the spring clip 82. The spring 66 has forced the implement coupling axially to a position where the gap 73 has been eliminated.

Upon further rotation of the rock shaft 93, causing the rear end of the main frame assembly 100 to be elevated, the drive coupling plate 24 will be guided by its beveled edge 36 and the beveled edge 47 of the implement coupling plate's annular ridge 46 into the well 48 formed by said annular ridge. Upon further elevation of the implement frame assembly, the implement and tractor plates will be pivoted towards the vertical position and the implement coupling will be shifted axially rearwardly opening the gap 73.

There is no assurance that upon engagement of the drive coupling plate 24 with the implement coupling plate 44 that the lug 26 will be aligned with the slot 50. When the lug and slot are not aligned, the upper surface 27 of the lug will bear against the planar face of the implement coupling plate 44. Upon actuation of the power takeoff shaft 113, the drive coupling plate will rotate relative to the implement coupling plate until lug 26 registers with slot 50. When this registry is obtained, spring 66 will force lug 26 into slot 50 and through the sliding engagement of surfaces 29 and 31 with surfaces 52 and 74 the drive and implement coupling plates will be locked together.

As best seen in FIGURE 3 with the implement and drive coupling plates in driving engagement, the gap 73 should be open. It has been found that a gap of approximately ⅛ of an inch is optimum. In the initial adjustment of the implement to the tractor, washers 79 should be added or subtracted to provide for a gap when the implement and drive plates are in driving engagement. By providing a gap 73 there is an assurance that the spring 66 will function to bias the implement coupling plate into engagement with the drive coupling plate.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A device for coupling the power take-off shaft of a power source to the input drive of an implement comprising: a power source having a horizontally arranged power take-off shaft, a drive coupling carried by said power take-off shaft, said drive coupling including a drive coupling plate having a generally planar face; an implement including an implement frame assembly adapted to be raised for coupling to said power source, an input drive shaft journaled along a horizontal axis on said implement frame assembly, an implement coupling carried by said implement drive shaft and adapted to rotate therewith, said implement coupling including an implement universal joint having an implement coupling plate secured to one end thereof, said implement coupling plate having a generally planar face, guide means carried by said implement frame assembly above said input drive shaft, said guide means adapted to hold said implement coupling plate at an acute angle to the vertical with the planar face exposed upwardly; said drive and implement coupling plates including interengaging means for locking said plates together when said planar faces meet; said implement being arranged with respect to said power source such that upon elevating the implement, the implement coupling plate will engage the power source coupling plate thus releasing the implement coupling plate from said guide means and permitting engagement of said interengaging means.

2. The invention as set forth in claim 1 wherein said drive coupling includes a universal joint between the power source power take-off shaft and the drive coupling plate.

3. The invention as set forth in claim 1 wherein connecting means are provided for connecting said implement coupling to said input drive shaft, said connecting means adapted to prevent relative rotation but permit axial movement between limits, and spring means adapted to bias said implement coupling toward said drive coupling.

4. The invention as set forth in claim 1 wherein connecting means are provided for connecting said implement coupling to said input drive shaft, said connecting means including a rod having an irregular shaped cross section secured to the other end of said implement universal joint, the input drive shaft having a tubular aperture formed along its axis corresponding in cross section to said rod and adapted to slidably receive said rod, said rod having a free end portion that protrudes through said input drive shaft, and limit means carried by said free end portion of said rod to limit axial movement of said implement coupling toward said drive coupling.

5. The invention as set forth in claim 4 wherein spring means are provided around said rod reacting against said implement universal joint in said implement frame to bias said implement coupling toward said drive coupling.

6. The invention as set forth in claim 1 wherein said drive coupling plate includes an elongated lug protruding outwardly from said planar face, and said implement coupling plate having an elongated slot formed in its planar face adapted to receive said elongated lug.

7. The invention as set forth in claim 6 wherein said drive coupling plate has a circular shape and said implement coupling plate has an annular ridge protruding out from its planar face, said annular ridge being dimensioned to loosely receive said drive coupling plate.

8. The invention as set forth in claim 7 wherein the end surfaces and a portion of each side surface of the elongated lug diverge toward the planar face of said drive coupling plate and function to direct said elongated lug into said elongated slot.

9. The invention as set forth in claim 6 wherein the end surfaces and a portion of each side surface of said elongated lug diverge toward the planar face of said tractor coupling plate and function to direct said elongated lug into said elongated slot.

10. The invention as disclosed in claim 9 wherein said portions of each side surface of said elongated lugs are diagonally located with respect to each other and are limited to opposite ends of said lug.

11. The invention as set forth in claim 10 wherein the other end of said side surfaces converge toward the planar face of said drive coupling plate forming undercut surfaces, surfaces on the side walls of said elongated slot diverge away from its planar face, and wherein the undercut surfaces of said elongated lug and said surfaces on the side walls of said elongated slot cooperate to form said interengaging means for locking said plates together.

12. The invention as set forth in claim 1 wherein said drive coupling plate has a circular shape and said implement coupling plate has an annular ridge protruding out from its planar face, said annular ridge being dimensioned to loosely receive said drive coupling plate.

13. A device for coupling the power take-off shaft of a power source to the input drive shaft of an implement comprising: a power source having a horizontally arranged power take-off shaft, a drive coupling carried by said power take-off shaft, said drive coupling including a drive coupling plate; an implement including an implement frame pivotally connected to said power source at a point spaced from said drive coupling, an input drive shaft journaled along a horizontal axis on said implement frame assembly, an implement coupling carried by said implement drive shaft and adapted to rotate therewith, said implement coupling adapted to engage said drive coupling upon pivoting said implement frame upwardly, said implement coupling including an implement universal joint having an implement coupling plate secured to one end thereof; said drive and implement coupling plate including interengaging means for locking said plates together when said coupling plates meet; said implement being arranged with respect to said power source such that upon elevating the implement, the implement coupling plate will engage the drive coupling plate thus permitting engagement of said interengaging means.

14. A device for coupling the power take-off shaft of a power source to the input drive shaft of an implement comprising: a power source having a horizontally arranged power take-off shaft, a drive coupling carried by said power take-off shaft, said drive coupling including a drive coupling plate having a generally planar face; an implement including an implement frame pivotally connected to said power source at a point spaced from said drive coupling, an input drive shaft journaled along a horizontal axis on said implement frame assembly, an implement coupling carried by said implement drive shaft and adapted to rotate therewith, said implement coupling adapted to engage said drive coupling upon pivoting said implement frame upwardly, said implement coupling including an implement universal joint having an implement coupling plate secured to one end thereof, said implement coupling plate having a generally planar face, guide means carried by said implement frame assembly above said implement drive shaft, said guide means adapted to hold said implement coupling plate at an angle to the vertical with the planar face exposed upwardly; said drive and implement coupling plates including interengaging means for locking said plates together when said planar faces meet; said implement being arranged with respect to said power source such that upon elevating the implement, the implement coupling plate will engage the drive coupling plate thus releasing the implement coupling plate from said guide means and permitting engagement of said interengaging means.

References Cited

UNITED STATES PATENTS

| | | | |
|---|---|---|---|
| 2,585,208 | 2/1952 | Abel | 56—15 |
| 2,831,307 | 4/1958 | Korsmo et al. | 56—15 X |
| 3,059,505 | 10/1962 | Reicks | 74—11 X |
| 3,141,341 | 7/1964 | Hutchinson | 74—11 |
| 3,320,730 | 5/1967 | Barkstrom et al. | 56—15 |

DONLEY J. STOCKING, *Primary Examiner.*

L. H. GERIN, *Assistant Examiner.*